(12) United States Patent
Makino

(10) Patent No.: US 11,400,607 B2
(45) Date of Patent: Aug. 2, 2022

(54) IMAGE PROCESSING DEVICE, ROBOT, IMAGE PROCESSING METHOD, AND RECORDING MEDIUM

(71) Applicant: CASIO COMPUTER CO., LTD., Tokyo (JP)

(72) Inventor: Tetsuji Makino, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 302 days.

(21) Appl. No.: 16/570,798

(22) Filed: Sep. 13, 2019

(65) Prior Publication Data

US 2020/0101630 A1 Apr. 2, 2020

(30) Foreign Application Priority Data

Oct. 1, 2018 (JP) .............................. JP2018-186685

(51) Int. Cl.
*G05B 15/00* (2006.01)
*G05B 19/00* (2006.01)
(Continued)

(52) U.S. Cl.
CPC ........... *B25J 19/023* (2013.01); *B25J 9/1697* (2013.01); *G06V 40/166* (2022.01)

(58) Field of Classification Search
CPC . G05D 3/12; G06T 13/40; G06T 2207/30201; G06T 7/73; G06T 7/20; G06T 7/60; B25J 11/0005; B25J 19/023; B25J 9/1697; H04N 5/23219; H04N 5/23229; H04N 5/2621; H04N 5/232;
(Continued)

(56) References Cited

U.S. PATENT DOCUMENTS 8,818,556 B2 * 8/2014 Sanchez ................. G06N 3/008
700/253
9,950,431 B2 * 4/2018 Fouillade ............... B25J 19/023
(Continued)

FOREIGN PATENT DOCUMENTS

CN 103400157 A 11/2013
CN 108230366 A 6/2018
(Continued)

OTHER PUBLICATIONS

Chinese Office Action (and English language translation thereof) dated Nov. 2, 2020 issued in counterpart Chinese Application No. 201910879412.X.
(Continued)

*Primary Examiner* — Harry Y Oh
(74) *Attorney, Agent, or Firm* — Holtz, Holtz & Volek PC

(57) ABSTRACT

An image processing device includes an acquirer, a face detector, and a change detector. The acquirer acquires images captured in succession by an image capturer. The face detector executes a first detection processing (face detection processing) that detects a certain target (face of a person) from a central area of the acquired image. The change detector executes second detection processing to detect a change over time in a surrounding area other than the central area in the acquired image. The second detection processing has a smaller processing load required per unit pixel in the image than that of the first detection processing.

16 Claims, 7 Drawing Sheets

(51) Int. Cl.
*B25J 19/02* (2006.01)
*B25J 9/16* (2006.01)
*G06V 40/16* (2022.01)

(58) Field of Classification Search
CPC ........... G06K 9/00228; G06K 9/00255; G06K 9/00268; G06K 9/00302; G06K 9/00664; G06K 9/00221
See application file for complete search history.

(56) References Cited

U.S. PATENT DOCUMENTS

| | | | | |
|---|---|---|---|---|
| 2004/0104702 | A1* | 6/2004 | Nakadai | G06T 1/0014 318/568.12 |
| 2014/0063319 | A1* | 3/2014 | Miyata | H04N 5/232945 348/333.03 |
| 2016/0301854 | A1* | 10/2016 | Kato | H04N 5/232125 |
| 2017/0100842 | A1* | 4/2017 | Le Borgne | B25J 9/1694 |
| 2018/0337985 | A1* | 11/2018 | Nishikawa | H04L 67/1059 |
| 2018/0365483 | A1* | 12/2018 | Nakagome | G06K 9/00248 |
| 2019/0246038 | A1* | 8/2019 | Kim | H04N 5/23245 |
| 2019/0362479 | A1* | 11/2019 | Shibata | H04N 5/232 |
| 2020/0020333 | A1* | 1/2020 | Amores | G10L 15/32 |

FOREIGN PATENT DOCUMENTS

| | | | |
|---|---|---|---|
| JP | 2009020163 A | | 1/2009 |
| JP | 2013118712 A | | 6/2013 |
| JP | 2013193149 A | * | 9/2013 |
| JP | 2013193149 A | | 9/2013 |

OTHER PUBLICATIONS

Japanese Office Action (and a English language translation thereof) dated May 10, 2022, issued in counterpart Japanese Application No. 2018-186685.

* cited by examiner

IMAGE PROCESSING DEVICE, ROBOT, IMAGE PROCESSING METHOD, AND RECORDING MEDIUM

CROSS-REFERENCE TO RELATED APPLICATION

This application claims the benefit of Japanese Patent Application No. 2018-186685, filed on Oct. 1, 2018, the entire disclosure of which is incorporated by reference herein.

FIELD

The present disclosure relates to an image processing device, a robot, an image processing method, and a recording medium.

BACKGROUND

Face detection processing that detects a face of a person from captured images is known. A method for face detection focusing only on a central area in a captured image to reduce processing load on face detection is described in Unexamined Japanese Patent Application Kokai Publication No. 2009-20163.

SUMMARY

According to one aspect of the present disclosure, an image processing device includes a processor configured to acquire images captured in succession, execute first detection processing to detect a certain target from a central area in the acquired images, and execute second detection processing to detect a change over time in another area other than the central area in the acquired image. The second detection processing has a smaller processing load required per unit pixel in the image than that of the first detection processing.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present disclosure are described in detail with reference to the drawings. The same reference signs are used to refer to the same or like parts throughout the drawings.

Figure 1:
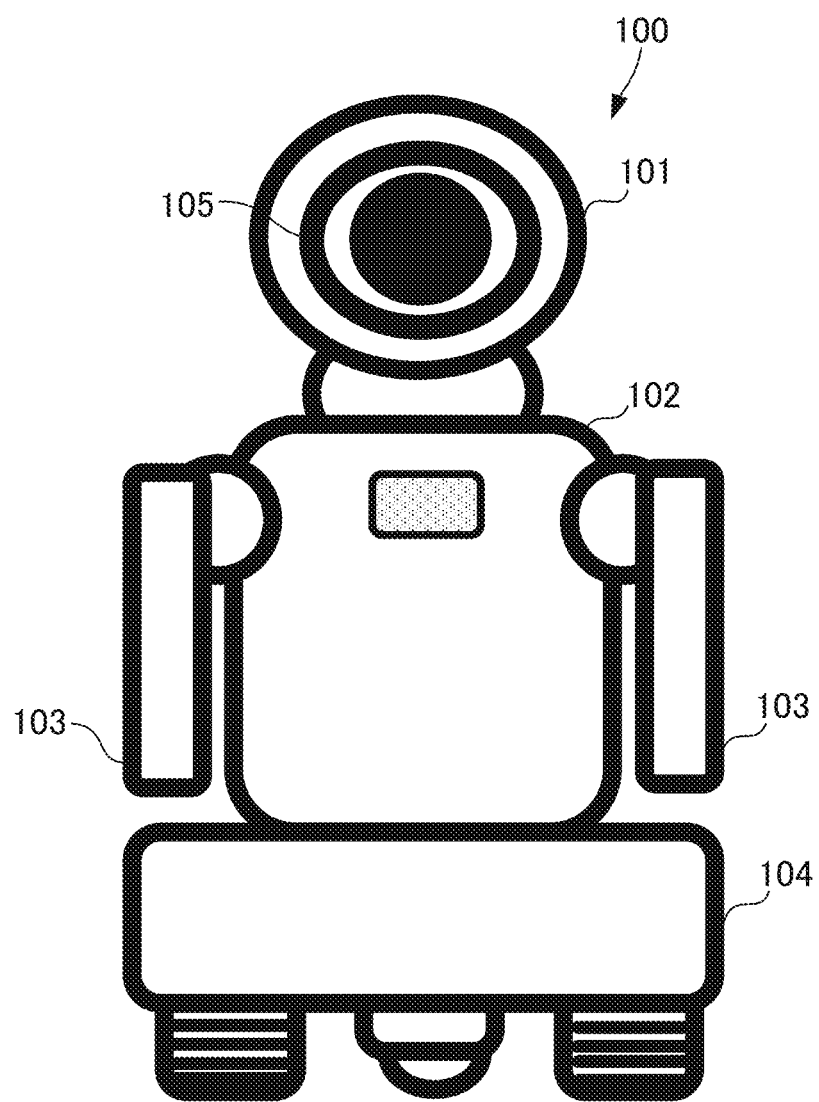
FIG. 1 is a drawing illustrating an appearance of a robot according to an embodiment of the present disclosure.

FIG. 1 illustrates an appearance of a robot 100 according to Embodiment 1 of the present disclosure. The robot 100 is a communication robot that is often used at home, exhibition sites, or the like and capable of communicating with a user. The robot 100 autonomously operates in accordance with a predefined operation program.

As illustrated in FIG. 1, the robot 100 has a substantially human-like three-dimensional shape in appearance. The robot 100 is mainly made of a hard synthetic resin, such as plastic. The robot 100 includes a head 101, a body 102, arms 103, and legs 104.

The head 101, the arms 103, and legs 104 are parts movable by a drive member embedded in the robot 100. For example, the head 101 is attached to the body 102 so as to be rotatable in three directions, pitch, roll, and yaw, by a neck joint provided at the neck. Then the head 101 is provided with an image capturer 105 that captures an image of a scene in front of the robot 100.

Figure 2:
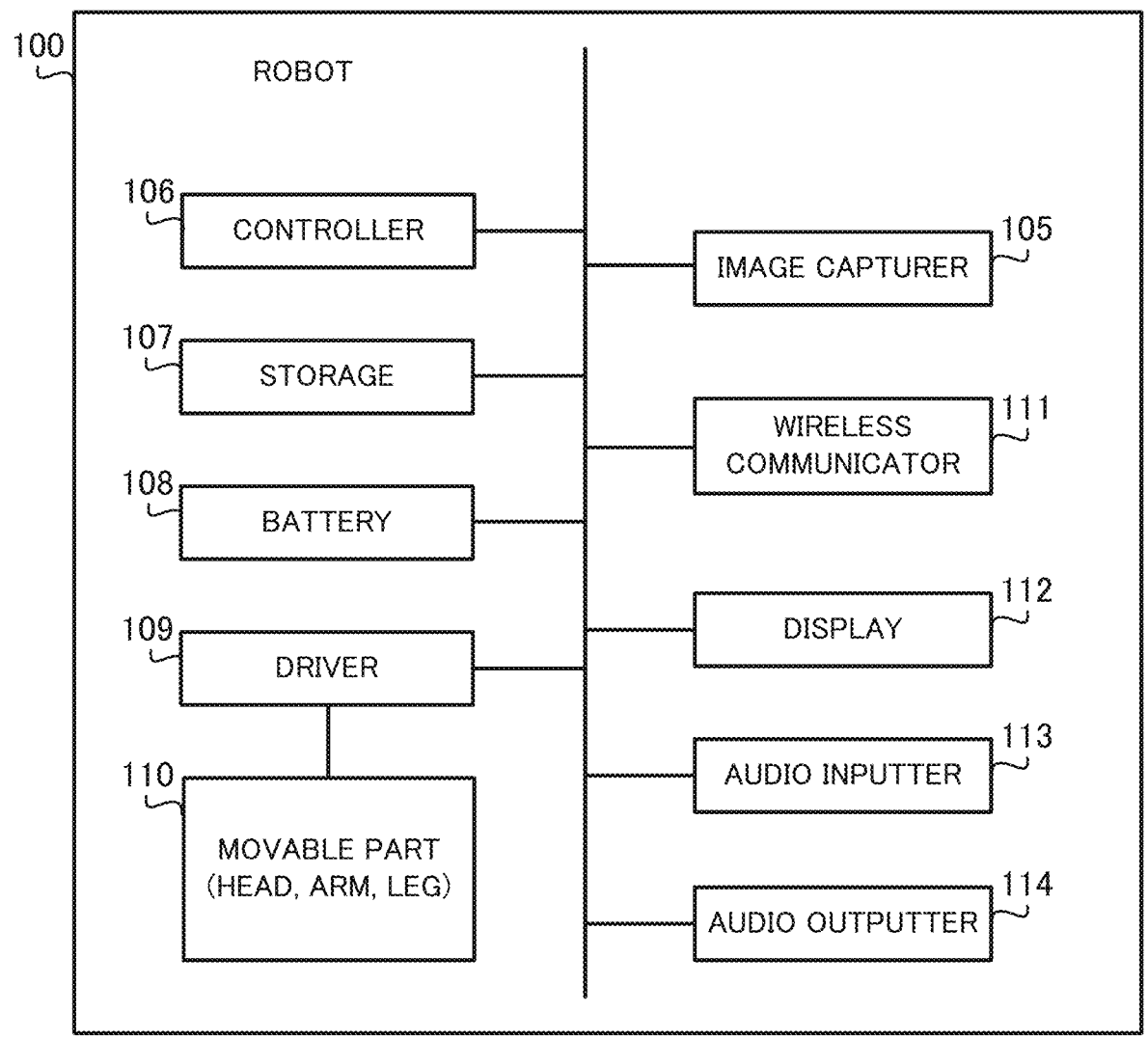
FIG. 2 is a block diagram illustrating a hardware configuration of the robot according to the embodiment.

FIG. 2 illustrates a hardware configuration of the robot 100. As illustrated in FIG. 2, the robot 100 includes the image capturer 105, a controller 106, a storage 107, a battery 108, a driver 109, a movable part 110, a wireless communicator 111, a display 112, a sound inputter 113, and a sound outputter 114.

The controller 106 includes a central processing unit (CPU), a read only memory (ROM), and a random access memory (RAM). The CPU, such as a microprocessor or the like, is a central processing unit that executes processing tasks and operations. In the controller 106, the CPU controls operations of the entire robot 100 by retrieving control programs stored in the ROM and using the RAM as work memory.

The controller 106 also includes a processor for graphics processing, for example, a graphics processing unit (GPU), and various types of buffer memory. The controller 106 executes, by the processor for graphics processing, face detection processing and change detection processing using a well-known image recognition technique. The face detection processing detects a face of a person from a central area in an image captured by the image capturer 105. The change detection processing detects a change over time in another area other than the central area in the image. The another area is hereinafter referred to as a surrounding area.

The storage 107 is a non-volatile memory, such as a flash memory, a hard disk, or the like. The storage 107 stores programs and data that include operating system (OS) and application programs, which the controller 106 uses for performing various processing tasks. For example, the storage 107 stores data for locating the central area and the surrounding area from the image captured by the image capturer 105. For example, the central area can be defined as a rectangular area covering 40 percent of all the image from the center of the image obtained by capturing of the central area, and the surrounding area can be defined as an area other than the central area in the image. Such definition of the central area and the surrounding area, however, is freely selectable. The central area and the surrounding area may be defined to have different percentages of coverage from those of the above-described example. An area having a shape of a circle or an ellipse in the center of the image may be the central area. The storage 107 stores data generated or acquired by the controller 106 performing various types of processing.

The battery 108 is a storage cell for storing electrical energy and supplying power to each component of the robot 100. The battery 108 is charged at a charge station after the robot 100 returns to the charge station.

The driver 109 includes a drive member, such as a motor or an actuator, that drives the movable part 110 of the robot 100, and a drive circuit that drives these drive members. The movable part 110 is a part capable of moving and specifically a head 101, arms 103, and legs 104. The controller 106 sends a control signal to the drive circuit based on operation program. The drive circuit supplies a drive pulse signal to the drive member in accordance with the control signal sent by the controller 106. The drive member drives the movable part 110 in accordance with the drive pulse signal supplied by the drive circuit.

The robot 100 can take a variety of actions by drive of the movable part 110 by the driver 109. For example, the robot 100 can move back and forth and change the orientation of the robot 100 by moving the legs 104. The robot 100 can also change a capturing direction of the image capturer 105 located on the head 101 by drive of the head 101 by the driver 109.

The image capturer 105 is a camera and is located on the head 101. The image capturer 105 captures an image of a scene in a direction in which the head 101 is oriented. The image capturer 105 captures an image every predetermined time (e.g., every 1/60 sec). That is, the image capturer 105 captures images in succession. Time intervals of image capturing by the image capturer 105 need not be constant.

The wireless communicator 111 includes an interface for wireless communication with external devices. The wireless communicator 111, under control by the controller 106, wirelessly communicates with external devices, such as the charge station for charging the robot 100, a cloud server, or the like in accordance with communication standards, for example, wireless local area network (LAN) such as wireless fidelity (Wi-Fi), Bluetooth (registered trademark), near field communication (NFC), or the like.

The display 112 is a display device, examples of which include a liquid crystal display, an organic electro luminescence display, and a light emitting diode. The display 112 displays a variety of images depending on the circumstances under control by a non-illustrated display drive circuit.

The sound inputter 113 is disposed on the head 101, and detects (acquires) voice uttered by a user, surrounding environmental sound, or the like and output the detected sound to the controller 106. The robot 100 includes non-illustrated microphones surrounding the head 101 as the sound inputter 113, and can effectively detect sound generated in all directions.

The sound outputter 114 includes a speaker and a sound output interface, and converts sound data generated by the controller 106 into sound and outputs the resulting sound to the outside. The speaker is disposed on the head 101. The sound outputter 114 outputs various sounds including animal sounds and human speech. For example, the robot 100 collects, at the sound inputter 113, sound of a communication target and outputs, from the sound outputter 114, sound corresponding to content of utterance by the communication target. This enables the robot 100 to have a simple conversation with the communication target.

Figure 3:
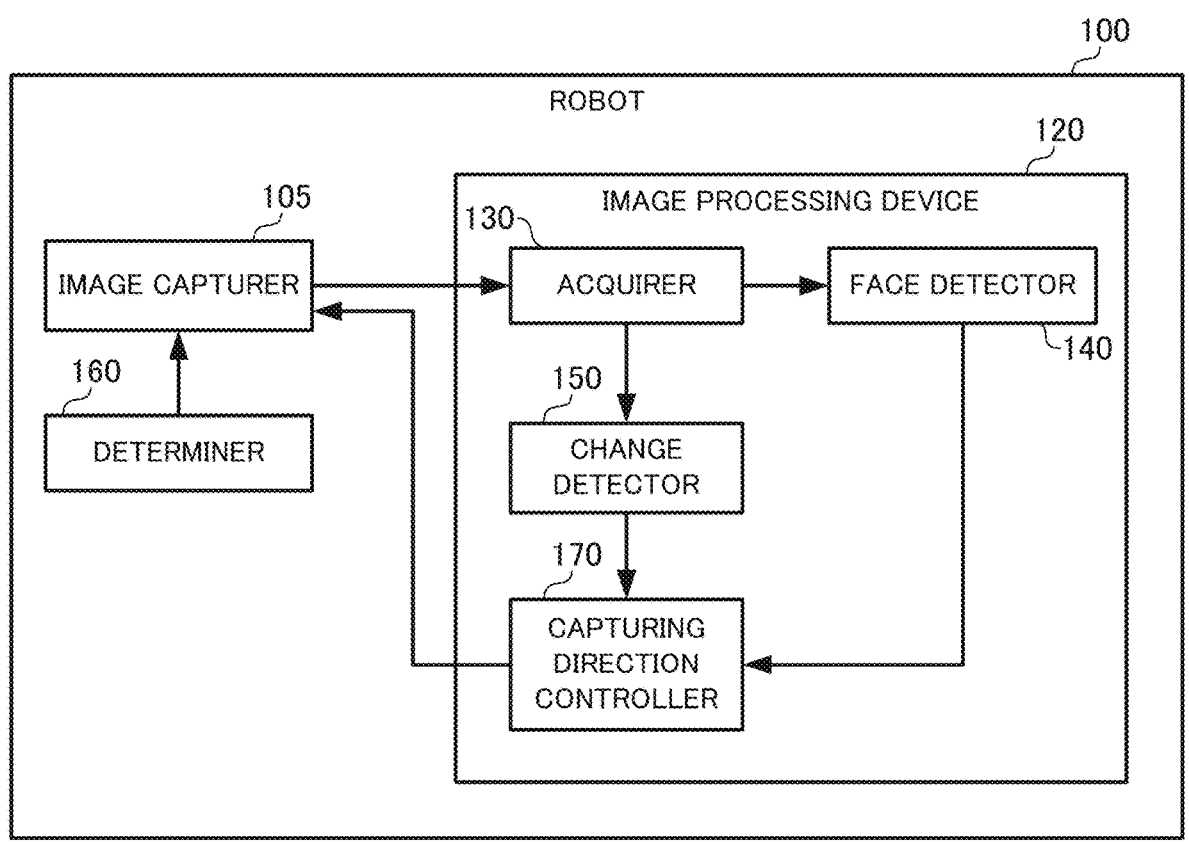
FIG. 3 is a block diagram illustrating a functional configuration of the robot according to the embodiment.

Next, a functional configuration of the robot 100 according to the present disclosure is described with reference to FIG. 3. As illustrated in FIG. 3, the robot 100 includes, as functional components, an acquirer 130, a face detector 140, a change detector 150, a determiner 160, and a capturing direction controller 170. These components functions in the controller 106 by the CPU retrieving programs stored in the ROM out to the RAM and executing the retrieved program to perform a control. The acquirer 130, the face detector 140, the change detector 150, and the capturing direction controller 170 described above functionally corresponds to the function of the image processing device 120 included in the robot 100.

The acquirer 130 acquires images captured in succession by the image capturer 105.

The face detector 140 executes, using a well-known method, face detection processing that detects a face of a person from an image acquired by the acquirer 130. The face detector 140 then executes the face detection processing only on a central area in the acquired image. For example, the face detector 140 may store beforehand, in the storage 107, data that is a template for a face of a person or data indicating features of the face, and detect the face of the person from the central area referring to the data. The face detection processing executed by the face detector 140 is an example of the first detection processing of the present disclosure.

The change detector 150 detects a change over time in a surrounding area (i.e., an area other than the central area) surrounding the central area in the image acquired by the acquirer 130. The change detector 150 detects only the change and does not identify the detected change in detail. Thus the processing performed by the change detector 150 has a smaller processing load required per unit pixel in the image than that of the face detection processing performed by the face detector 140. The processing executed by the change detector 150 is an example of the second detection processing of the present disclosure.

For example, the change detector 150 detects a change over time in the surrounding area based on feature points within the surrounding area in the image acquired by the acquirer 130. Specifically, the change detector 150 firstly detects the feature points from the surrounding area for each of the images captured in succession by the image capturer 105. The change detector 150 then determines an amount of motion (motion vector) of the detected feature points between images. When the determined amount of motion is equal to or greater than a threshold, the change detector 150 detects, as a portion where a change has occurred, positions of the feature points in the most current image.

Alternatively, the change detector 150 may detect a change over time in the surrounding area based on a difference in the surrounding areas between the images captured in succession. Specifically, the change detector 150 calculates a difference in pixel values for every pixel with respect to the surrounding areas of the images captured in succession by the image capturer 105. Then when there is a pixel for which the calculated difference is equal to or greater than the threshold, the change detector 150 then detects the portion of the pixel as the portion where change has occurred.

The aforementioned method for detection of the change by the change detector 150 is just an example, and another method may be used for detection of a change from the surrounding area in the image.

The determiner 160 determines whether a condition is satisfied.

The capturing direction controller 170 controls the driver 109 to drive the head 101 so as to change the capturing direction of the image capturer 105 provided on the head 101. For example, when the determiner 160 determines that the condition is satisfied, the capturing direction controller 170 controls, when the change over time in the surrounding area in the image is detected by the change detector 150, the capturing direction of the image capture 105 to center a change portion in the imaging range of the image capturer 105. The change portion is a portion where the change has occurred. When the image capturer 105 is movably attached to the head 101, the capturing direction controller 170 may change the capturing direction by moving the image capturer 105.

A flow of steps executed by the robot 100 configured as above is described with reference to the flow chart of FIG. 4.

Figure 4:
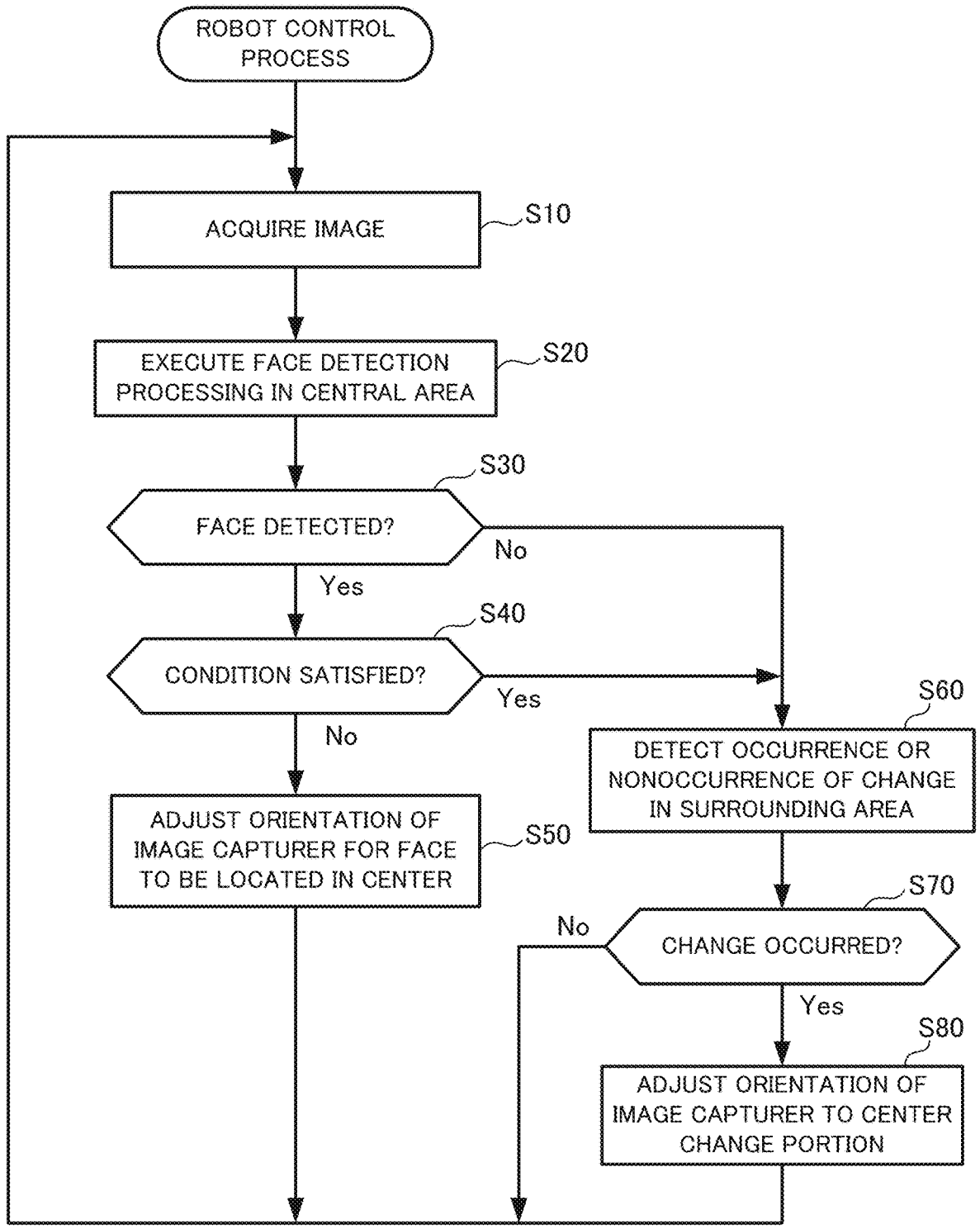
FIG. 4 is a flow chart illustrating a flow of a robot control process executed by the robot according to the embodiment.

A robot control process as illustrated in FIG. 4 starts upon the robot 100 being ready for proper operation after power-up of the robot 100 and the battery 108 being charged.

Upon start of the robot control process, the controller 106, which serves as the acquirer 130, acquires the latest one of the images captured in succession by the image capturer 105 (Step S10).

The controller 106, which serves as the face detector 140, then executes the face detection processing that detects a face of a person from a central area in the acquired image (Step S20).

When the face is detected in the face detection processing (Yes in Step S30), the controller 106, which serves as the determiner 160, determines whether a condition is satisfied (Step S40).

The "a condition" usable in Step S40 can include various conditions. For example, the controller 106 may determine that the condition is satisfied when the robot 100 does not communicate with a person having a face that the robot 100 has succeeded in detecting.

Alternatively, the controller 106 determines whether the face detected based on a gaze direction or the like using a well-known method orients toward the robot 100. When a determination is made that the face does not orient toward the robot 100, the controller 106 may determine that the condition is satisfied.

Alternatively, the controller 106 may determine that the condition is satisfied when a size of the face detected in the face detection processing is smaller than a threshold. Alternatively, the controller 106 may determine that the condition is satisfied when the sound inputter 113 does not continuously receive voice from the person with the face for a period.

Alternatively, a function of registering as "favorites" a face of a person who has communicated with the robot 100 at not less than a predetermined frequency or a face set by a user may be embedded in the robot 100. The controller 106 may then determine that the condition is satisfied when the face detected in the face detection processing is not registered as "favorites".

When a determination is made that the condition is not satisfied (No in Step S40), the controller 106 serves as the capturing direction controller 170, and controls the driver 109 to center the face in the imaging range of the image capturer 105 (Step S50). The driver 109 drives the head 101 in accordance with instructions of the controller 106. This adjusts the orientation of the image capturer 105 disposed on the head 101 to center the detected face in the imaging range. The controller 106 may adjust the position or orientation of the image capturer 105 by driving the legs 104. The process returns to Step S10.

When the face cannot be detected in the face detection processing (No in Step S30), or when the face is detected but a determination is made that the condition is satisfied (Yes in Step S30, Yes in Step S40), the controller 106, serves as the change detector 150, detects occurrence or nonoccurrence of the change over time in the surrounding area in the acquired image (Step S60).

For example, the controller 106 may detect the occurrence or nonoccurrence of the change by comparing the surrounding area in the latest image acquired in the current step S10 with the surrounding area in the image (previously acquired image) acquired in one preceding Step S10. The controller 106 may detect a change in the surrounding area using more images than the images captured in succession by the image capturer 105.

When the change is detected in Step S60 (Yes in Step S70), the controller 106, which serves as the capturing direction controller 170, controls the driver 109 to center the change portion in the imaging range of the image capturer 105 (Step S80). The driver 109 drives the head 101 in accordance with instructions of the controller 106. This adjusts the orientation of the image capturer 105 disposed on the head 101 so that the detected change portion is centered in the imaging range. Then the process returns to Step S10.

When the change is not detected in Step S60 (No in Step S70), the process returns to Step S10.

Next, the aforementioned robot control process is described by way of example.

Figure 5A:
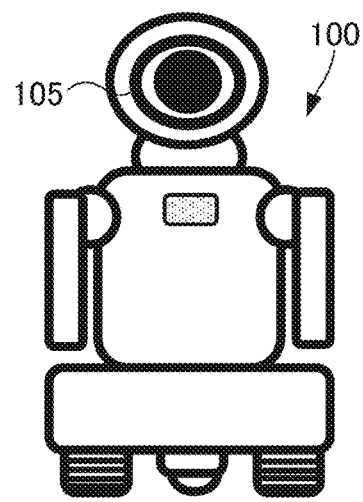
FIG. 5A is a drawing for explanation of a specific example of the robot control process executed by the robot according to the embodiment (first case)
Figure 5A:
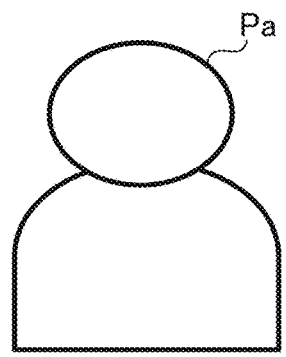
Figure 5B:
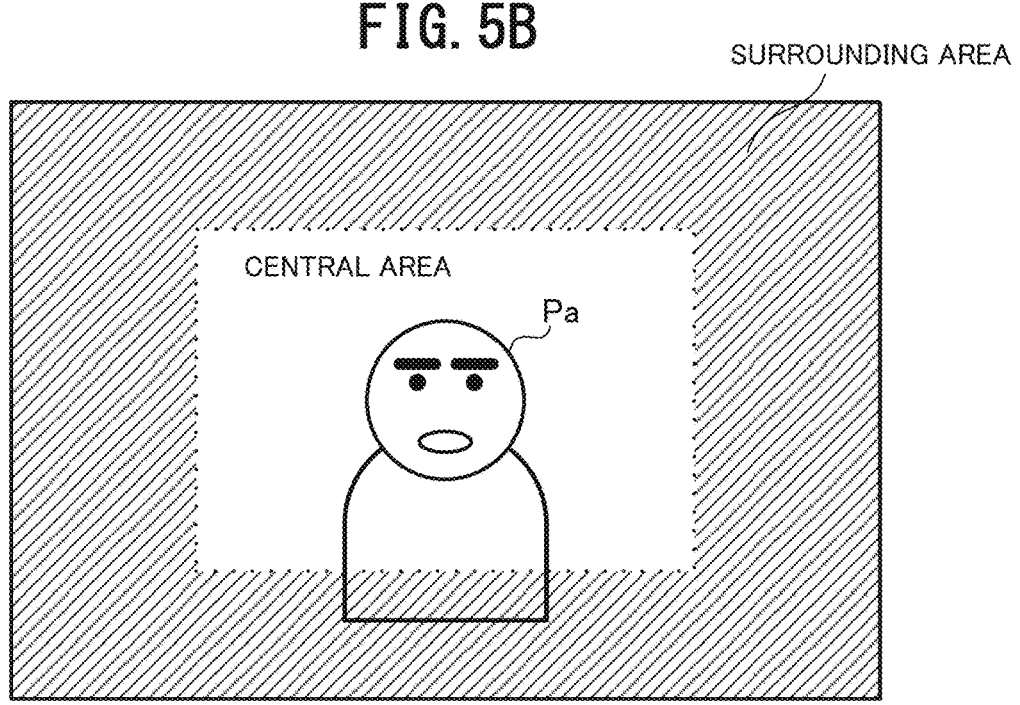
FIG. 5B is a drawing for explanation of the specific example of the robot control process executed by the robot according to the embodiment (second case)

Consider the case where a person Pa is located in front of the robot 100, as illustrated in FIG. 5A. In this case, the face detection processing is executed in the central area in the image captured by the image capturer 105 (Step S20), and a face of the person Pa is detected from the image captured in a moment as illustrated in FIG. 5B (Yes in Step S30). Then since the face of the person Pa is oriented to the robot, a determination is made that the condition is not satisfied (No in Step S40), and the capturing direction of the image capturer 105 is adjusted to center the face in the imaging range (Step S50).

Figure 6A:
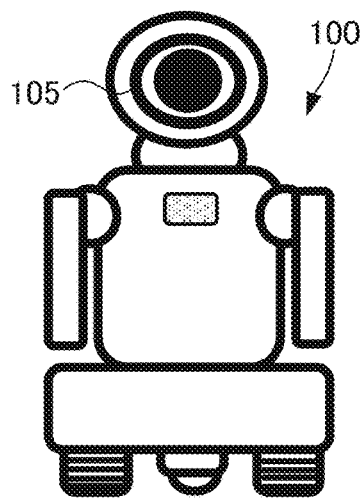
FIG. 6A is a drawing for explanation of the specific example of the robot control process executed by the robot according to the embodiment (third case)
Figure 6A:
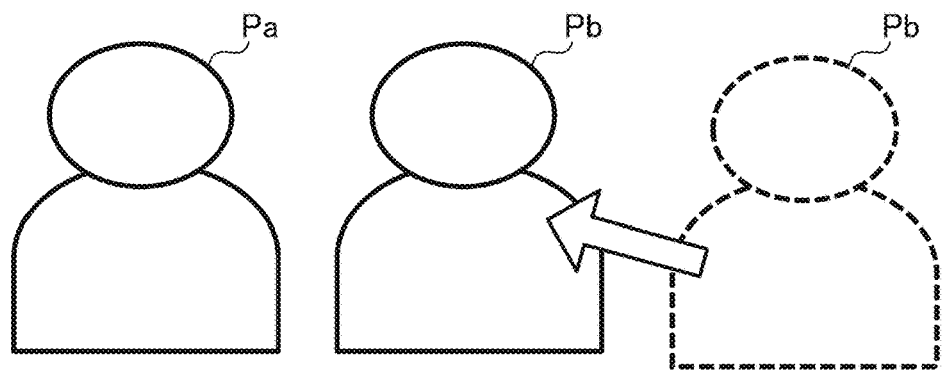

Consider the case where, as illustrated in FIG. 6A, another person Pb approaches the person Pa from the right side in the drawing and the person Pa looks aside and turns away his eyes from the robot.

Figure 6B:
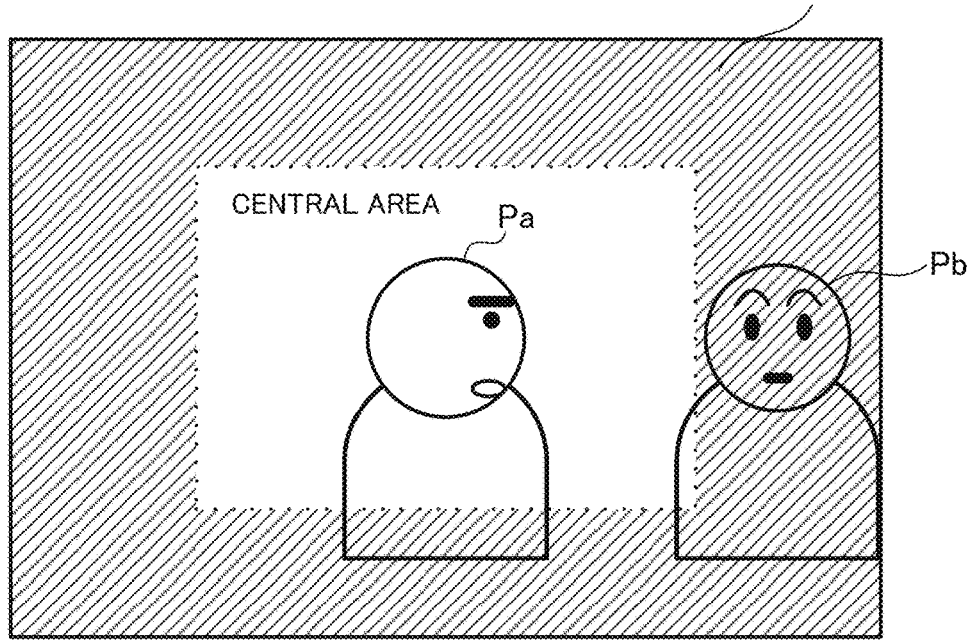
FIG. 6B is a drawing for explanation of the specific example of the robot control process executed by the robot according to the embodiment (fourth case)

In this case, as illustrated in FIG. 6B, the face of the person Pb is located in the surrounding area in the image captured by the image capturer 105 and not located in the central area. Thus the face of the person Pb is an out of the face detection processing and is not detected.

Figure 7A:
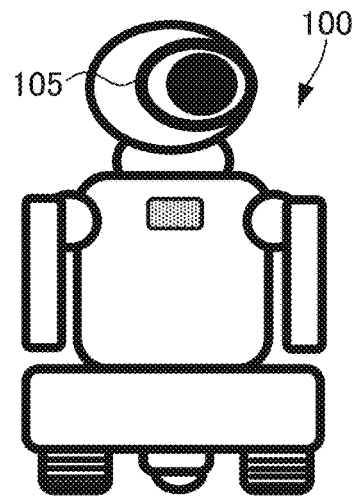
FIG. 7A is a drawing for explanation of the specific example of the robot control process executed by the robot according to the embodiment (fifth case)
Figure 7A:
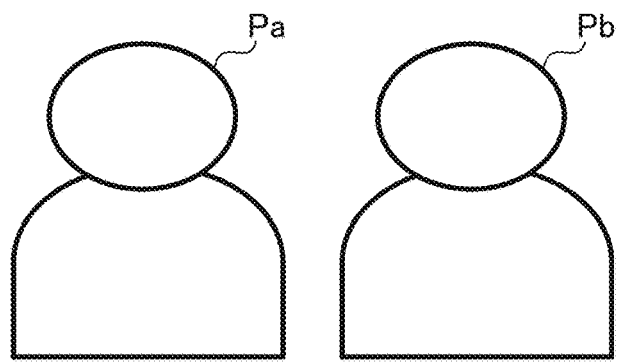
Figure 7B:
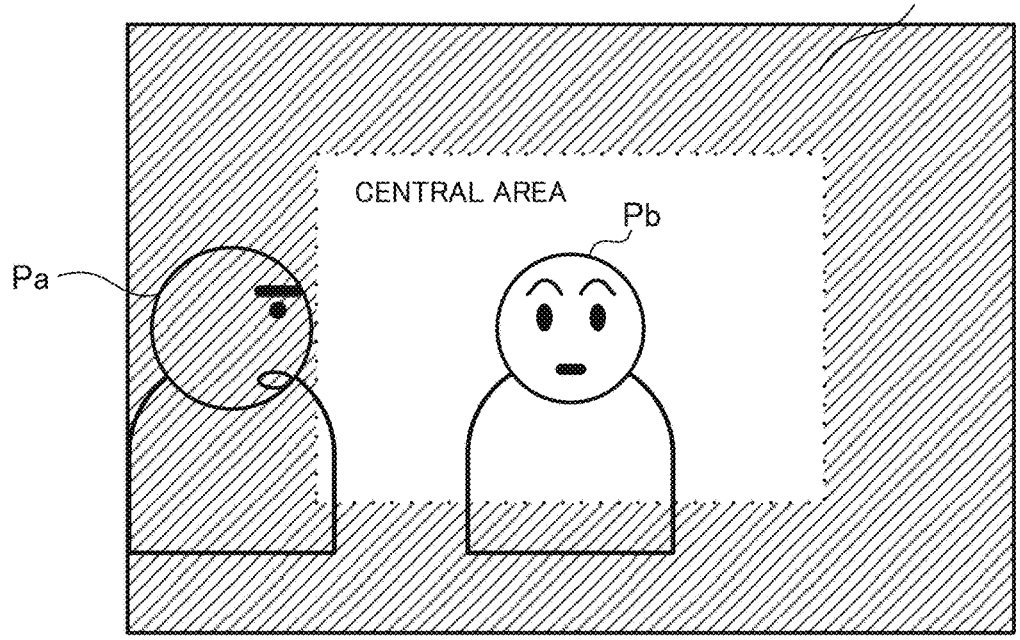
FIG. 7B is a drawing for explanation of the specific example of the robot control process executed by the robot according to the embodiment (sixth case).

In contrast, a determination is made that the condition is satisfied since the face of the person Pa being detected in the current face detection processing is not oriented to the robot (Yes in Step S40), the occurrence or nonoccurrence of the change in the surrounding area is determined (Step S60), and new appearance of the person Pb in the surrounding area is detected as the change (Yes in Step S70). Thus, as illustrated in FIG. 7A, the capturing direction of the image capturer 105 is controlled toward the person Pb (rightward in the drawing) detected as the change (Step S80). The person Pb is thereby centered in the image, as illustrated in FIG. 7B.

As described above, the robot 100 and the image processing device 120 according to the present embodiment executes first detection processing, which is face detection processing requiring relatively large load, targeted only on the central area in the image, and executes second detection processing, which is change-over-time detection processing requiring smaller load than the face detection processing, targeted only on another area other than the central area in the image. This enables detection from the entirety of the image, with loads reduced.

In addition, the robot 100 according to the embodiment includes an image capturer 105. When a change over time is detected in the surrounding area in the image, the robot 100 controls the capturing direction of the image capturer 105 to center the change portion in the imaging range. Robot 100 can thereby operate in cooperation with every action coming within an angle of view. For example, the robot 100 can take an animal-like action like sensing as a change a swaying curtain in the surroundings and responding to it.

The robot 100 according to the present embodiment can perform control to respond to the change in the surrounding area only when the condition is satisfied, for example, when the face is not oriented toward the robot 100 while the robot 100 detects the face in the face detection processing. This can thus prevent the robot 100 from behaving like interrupting conversion in response to the change in the surrounding area in the image when the robot 100 makes conversation with the person who has face detected by the robot 100.

Variation

The present disclosure is not limited to the aforementioned embodiments, and various modifications can be of course made without departing from the spirit or scope of the invention.

For example, in the above embodiments, the robot 100 and the image processing device 120 executes the face detection processing that detects the face of a person, but instead of the face detection processing, may execute detection processing that detects a certain target other than the face of the person, such as animals or the like.

In the robot control processing, if a change is detected in the surrounding area even while the face is detected in the face detection processing, the capturing direction may be changed toward the change portion without conditions. In this case, the robot 100 can always react sensitively to changes in the surroundings, which enables the robot 100 to take a more animal-like action. In the robot control process, control to adjust the orientation of the image capturer 105 may be performed so that the face of the robot 100 is located in the center of the image while the face is detected in the face detection processing.

In the robot control process, the controller 106 performs, when the change in the surrounding area is detected, the processing of controlling the capturing direction so that the change portion is centered in the imaging range of the image capturer 105 (Step S80). However, what the controller 106 performs is not limited thereto, and the controller 106 may execute various types of processing when a change is detected in the surrounding areas. For example, when the change is detected in the surrounding area, the controller 106 may control image capturing of the image capturer 105 by executing a control to increase an angle of view (imaging range) of the image capturer 105 or decrease the angle of view, for example, decrease the angle of view so that a subject staying in the surrounding area at that time is out of the imaging range, or the controller 106 may execute image processing on the captured image by cropping (cutting out) the surrounding area (the entirety or change portion only) from the captured image or cropping the central area from the captured image. In the robot control process, when detection of the face has not be done in the face detection processing or the condition is not satisfied, controller 106 may perform image processing that crops the central area to remove the surrounding area.

Setting which area in the image captured by the image capturer 105 to the central area or the surrounding area is freely selectable and may be set by a user as appropriate. For example, when the head 101 (image capturer 105) is driven only in the horizontal direction (yaw direction), only the left and right sides of the image may be set as the surrounding area.

A "robot" according to the present disclosure is not limited to a robot designed to communicate with a user as illustrated in FIG. 1. The "robot" according to the present disclosure includes, for example, a security robot, a security system, a monitoring system, and the like. Such robot includes, for example, an image capturing device such as a monitoring camera or the like, a computer, and a drive mechanism. The robot detects, by the computer, a face of a person from a central area in an image captured by the image capturing device, detects a change over time in a surrounding area in the captured image, and controls, when the change is detected, the drive mechanism to control the capturing direction of the image capturing device to center in the imaging range a portion where the change has occurred.

The functions according to the present disclosure can be provided in the form of an image processing device or a robot preconfigured to implement these functions, and furthermore, an information processing device or the like can function as an image processing device or a robot according to the present disclosure by application a program thereto. That is, the information processing device or the like can function as the image processing device or the robot according to the present disclosure by applying a program for implementing the individual functional components of the image processing device 120 or the robot 100 exemplified in the foregoing embodiment in such a way that the program can be executed by the CPU or the like that controls the information processing device or the like.

A method for applying such program can be freely selected. For example, the program may be stored in a computer-readable recording medium such as a flexible disk, a compact disc (CD)-ROM, a digital versatile disc (DVD)-ROM, or a memory card to be applied. In addition, the program may be superimposed on a carrier wave to be applied via the Internet or any other communication medium. For example, the program may be posted to a bulletin board system (BBS) on a communication network to be distributed. In this case, the information processing device may be configured so that the above-described processes can be executed by starting and executing the program under control of an operating system (OS) as with other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image processing device comprising:
a processor configured to acquire images captured in succession,
  execute first detection processing to detect a certain target from a central area in the acquired images,
  determine whether the certain target is detected from the central area in the acquired images by the first detection processing,
  in response to a determination that the certain target is not detected from the central area in the acquired images by the first detection processing, execute second detection processing to detect a change over time in another area other than the central area in the acquired images, wherein the second detection processing has a smaller processing load required per unit pixel in the acquired images than that of the first detection processing,
  in response to a determination that the certain target is detected from the central area in the acquired images by the first detection processing, determine whether a predetermined condition is satisfied,
  in response to a determination that the predetermined condition is satisfied while the certain target is detected in the first detection processing, execute the second detection processing to detect a change over time in said another area other than the central area in the acquired images, and
  when the change over time in the another area is detected in the second detection processing, control a capturing direction of a camera to center a change portion in a certain imaging range of the camera, the change portion being a portion where the change has occurred,
  wherein the processor is configured to execute the second detection processing only (i) in response to the determination that the certain target is not detected in the first detection processing and (ii) in response to the determination that the predetermined condition is satisfied while the certain target is detected in the first detection processing.

2. The image processing device according to claim 1, wherein the processor is configured to detect the change over time in the another area based on feature points in the another area by execution of the second detection processing.

3. The image processing device according to claim 1, wherein the processor is configured to detect the change over time in the another area based on a difference in the another area between the images captured in succession by execution of the second detection processing.

4. The image processing device according to claim 1, wherein the certain target is a face of a person.

5. The image processing device according to claim 1, wherein the processor is configured to:
  acquire images captured in succession by the camera, and
  execute processing based on at least one of a detection result by the first detection processing or a detection result by the second detection processing.

6. A robot comprising:
the image processing device according to claim 5; and
the camera.

7. The robot according to claim 6, wherein:
the processor is configured to determine whether the predetermined condition is satisfied, and
while detecting the certain target in the first detection processing, the capturing direction is controllable to center a portion other than the certain target in the certain imaging range of the camera only when determination is made that the predetermined condition is satisfied.

8. The robot according to claim 7, wherein:
the robot has a communication capability, and
the processor determines that the predetermined condition is satisfied when the robot does not communicate with a target corresponding to the certain target.

9. The robot according to claim 7, wherein the processor determines that the predetermined condition is satisfied when the certain target detected in the first detection processing does not face toward the robot.

10. The robot according to claim 7, when the processor determines that the predetermined condition is satisfied when a size of the certain target detected in the first detection processing is equal to or smaller than a threshold.

11. The robot according to claim 7, further comprising:
a microphone,
wherein the processor determines that the predetermined condition is satisfied when the microphone does not acquire sound continuously in a period from the certain target.

12. An image processing method comprising:
executing first detection processing to detect a certain target from a central area in captured images;
determining whether the certain target is detected from the central area in the captured images by the first detection processing;
in response to a determination that the certain target is not detected from the central area in the captured images by the first detection processing, executing second detection processing to detect a change over time in another area other than the central area in the captured images, wherein the second detection processing has a smaller processing load required per unit pixel in the captured images than that of the first detection processing;
in response to a determination that the certain target is detected from the central area in the captured images by the first detection processing, determining whether a predetermined condition is satisfied;
in response to a determination that the predetermined condition is satisfied while the certain target is detected in the first detection processing, executing the second detection processing to detect a change over time in said another area other than the central area in the captured images; and
when the change over time in the another area is detected in the second detection processing, controlling a capturing direction of a camera to center a change portion in a certain imaging range of the camera, the change portion being a portion where the change has occurred;
wherein the second detection processing is executed only (i) in response to the determination that the certain target is not detected in the first detection processing and (ii) in response to the determination that the predetermined condition is satisfied while the certain target is detected in the first detection processing.

13. A non-transitory computer-readable recording medium having stored thereon a program that is executable by a computer to control the computer to perform functions comprising:
  acquiring images captured in succession;
  executing first detection processing for detecting a certain target from a central area in the acquired images;
  determining whether the certain target is detected from the central area in the acquired images by the first detection processing;
  in response to a determination that the certain target is not detected from the central area in the acquired images by the first detection processing, executing second detection processing to detect a change over time in another area other than the central area in the acquired images, wherein the second detection processing has a smaller processing load required per unit pixel in the acquired images than that of the first detection processing;

in response to a determination that the certain target is detected from the central area in the acquired images by the first detection processing, determining whether a predetermined condition is satisfied;

in response to a determination that the predetermined condition is satisfied while the certain target is detected in the first detection processing, executing the second detection processing to detect a change over time in said another area other than the central area in the acquired images; and when the change over time in the another area is detected in the second detection processing, controlling a capturing direction of a camera to center a change portion in a certain imaging range of the camera, the change portion being a portion where the change has occurred, wherein the second detection processing is executed only (i) in response to the determination that the certain target is not detected in the first detection processing and (ii) in response to the determination that the predetermined condition is satisfied while the certain target is detected in the first detection processing.

14. The image processing device according to claim 1, wherein the processor is further configured to:

determine whether the predetermined condition is satisfied with respect to the certain target detected from the central area in the acquired images in the first detection processing, in response to a determination that the predetermined condition is not satisfied with respect to the certain target detected from the central area in the acquired images, control the capturing direction of the camera to center the certain target in the certain imaging range of the camera, the camera capturing the acquired images, in a case in which the change over time in said another area is not detected by the second detection processing that is executed in response to the determination that the predetermined condition is satisfied while the certain target is detected in the first detection processing, maintain the capturing direction of the camera such that the certain target remains in the central area; and in a case in which the change over time in said another area is not detected by the second detection processing that is executed in response to the determination that the certain target is not detected from the central area in the acquired images by the first detection processing, maintain the capturing direction of the camera.

15. The image processing method according to claim 12, wherein the method further comprises:

determining whether the predetermined condition is satisfied with respect to the certain target detected from the central area in the acquired images in the first detection processing, in response to a determination that the predetermined condition is not satisfied with respect to the certain target detected from the central area in the acquired images, controlling the capturing direction of the camera to center the certain target in the certain imaging range of the camera, the camera capturing the acquired images, in a case in which the change over time in said another area is not detected by the second detection processing that is executed in response to the determination that the predetermined condition is satisfied while the certain target is detected in the first detection processing, maintaining the capturing direction of the camera such that the certain target remains in the central area; and in a case in which the change over time in said another area is not detected by the second detection processing that is executed in response to the determination that the certain target is not detected from the central area in the acquired images by the first detection processing, maintaining the capturing direction of the camera.

16. The non-transitory computer-readable recording medium according to claim 13, wherein the program is executable by the computer to cause the computer to perform further functions comprising:

determining whether the predetermined condition is satisfied with respect to the certain target detected from the central area in the acquired images in the first detection processing, in response to a determination that the predetermined condition is not satisfied with respect to the certain target detected from the central area in the acquired images, controlling the capturing direction of the camera to center the certain target in the certain imaging range of the camera, the camera capturing the acquired images, in a case in which the change over time in said another area is not detected by the second detection processing that is executed in response to the determination that the predetermined condition is satisfied while the certain target is detected in the first detection processing, maintaining the capturing direction of the camera such that the certain target remains in the central area; and in a case in which the change over time in said another area is not detected by the second detection processing that is executed in response to the determination that the certain target is not detected from the central area in the acquired images by the first detection processing, maintaining the capturing direction of the camera.

* * * * *